No. 851,196. PATENTED APR. 23, 1907.
W. H. BEVANS & C. W. BARTHOLMES.
AUTOMATIC GUN.
APPLICATION FILED NOV. 18, 1902.

5 SHEETS—SHEET 1.

No. 851,196. PATENTED APR. 23, 1907.
W. H. BEVANS & C. W. BARTHOLMES.
AUTOMATIC GUN.
APPLICATION FILED NOV. 18, 1902.

5 SHEETS—SHEET 1

No. 851,196. PATENTED APR. 23, 190
W. H. BEVANS & C. W. BARTHOLMES.
AUTOMATIC GUN.
APPLICATION FILED NOV. 18, 1902.
5 SHEETS—SHEET
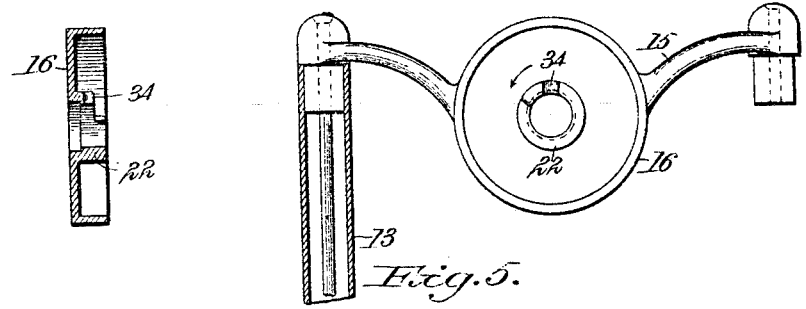
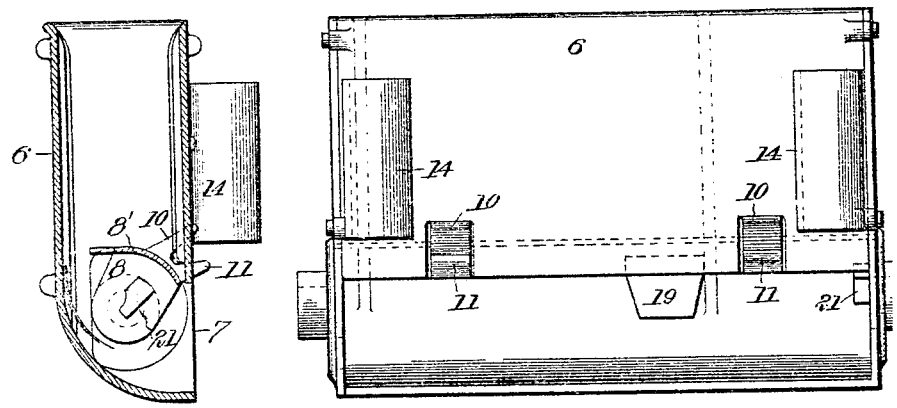
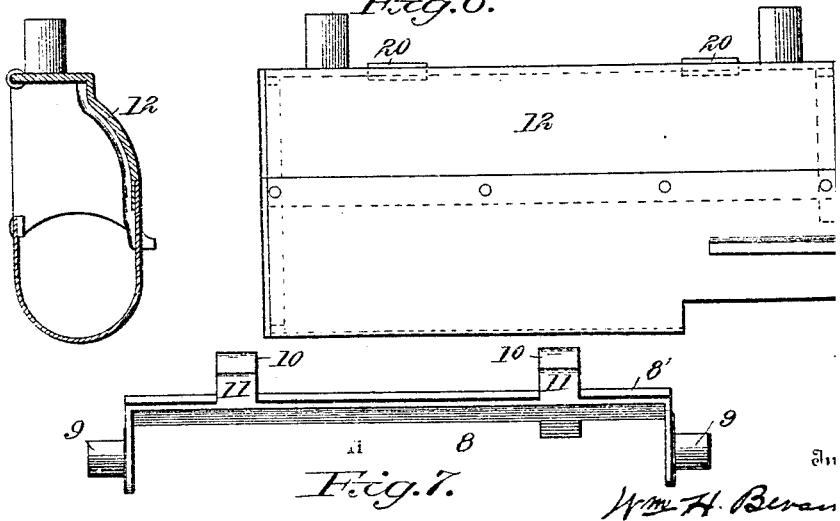
Witnesses
C. H. Walker,
J. M. Moore.

No. 851,196. PATENTED APR. 23, 190
W. H. BEVANS & C. W. BARTHOLMES.
AUTOMATIC GUN.
APPLICATION FILED NOV. 18, 1902.
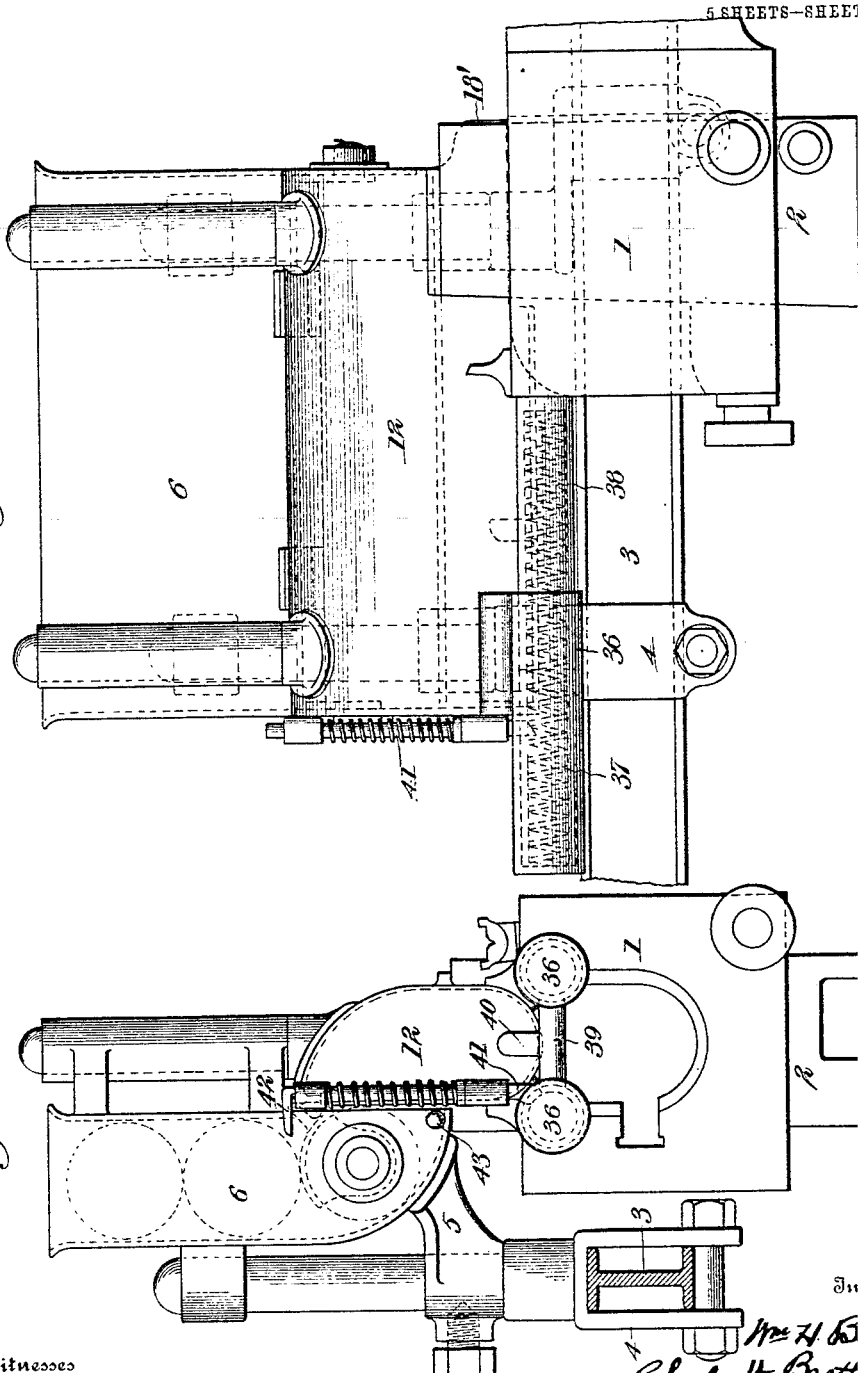

No. 851,196. PATENTED APR. 23, 1907.
W. H. BEVANS & C. W. BARTHOLMES.
AUTOMATIC GUN.
APPLICATION FILED NOV. 18, 1902.
5 SHEETS—SHEET 5.
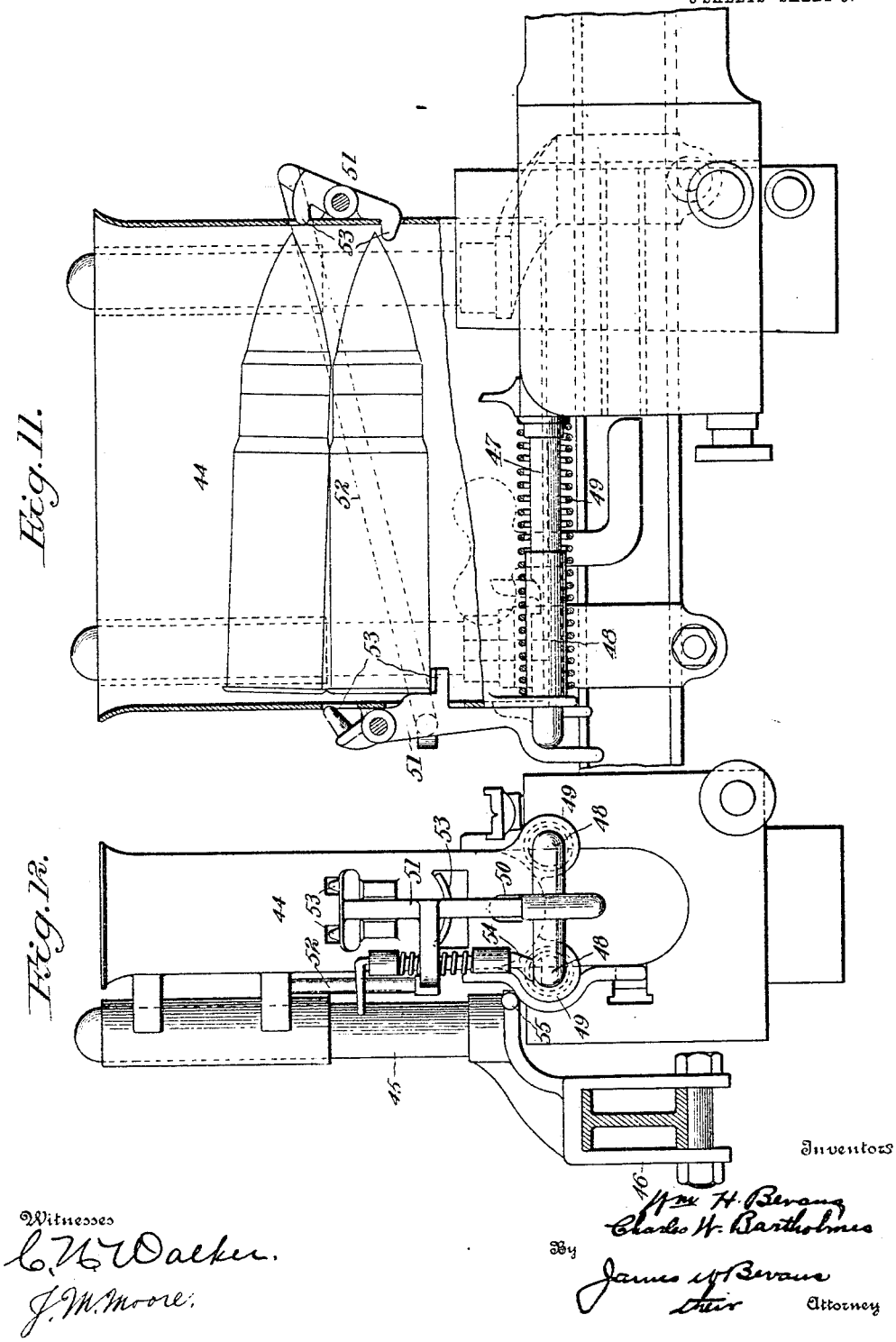

UNITED STATES PATENT OFFICE.

WILLIAM H. BEVANS, OF BRIDGEPORT, CONNECTICUT, AND CHARLES BARTHOLMES, OF ILION, NEW YORK, ASSIGNORS TO AMERICAN BRITISH MANUFACTURING COMPANY, AND AMERICAN MACHINE & C NANCE COMPANY, OF NEW YORK, N. Y., CORPORATIONS OF NEW YOR

AUTOMATIC GUN.

No. 851,196. Specification of Letters Patent. Patented April 23, 1!

Application filed November 18, 1902. Serial No. 131,798.

*To all whom it may concern:*

Be it known that we, WILLIAM H. BEVANS, of Bridgeport, in the county of Fairfield and State of Connecticut, (whose post-office address is Bridgeport, Connecticut,) and CHARLES W. BARTHOLMES, of Ilion, in the county of Herkimer and State of New York, (whose post-office address is Ilion, New York,) have invented certain new and useful Improvements in Automatic Guns; and we do hereby declare the following to be a full, clear, and exact description of the invention, such as will enable others skilled in the art to which it appertains to make and use the same.

This invention relates to improvements in automatic guns, and the object is to provide a simple and effective construction to be used in connection with a semi-automatic gun for automatically feeding and delivering the rounds of ammunition to the gun and ramming the same to proper position for firing, and to so construct said mechanism that it may be applied to guns already in service without altering the latter in any way.

Figure 1:
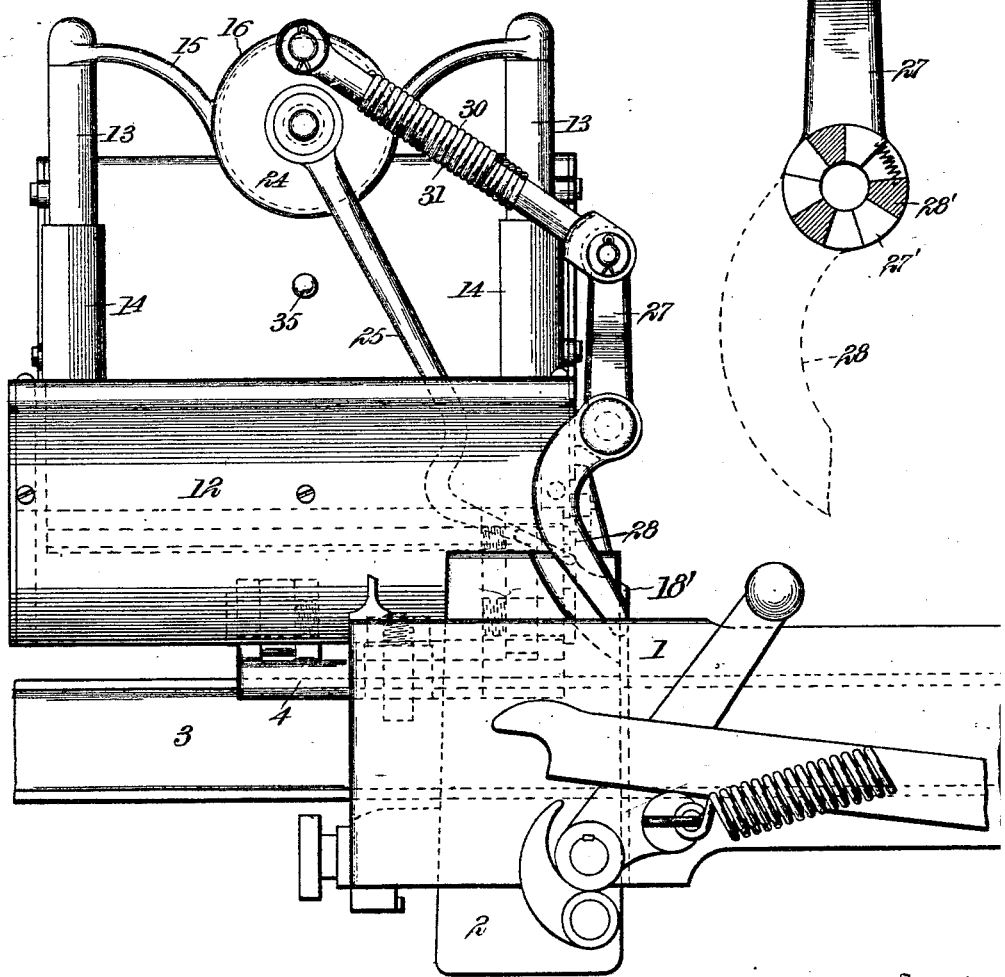
Figure 2:
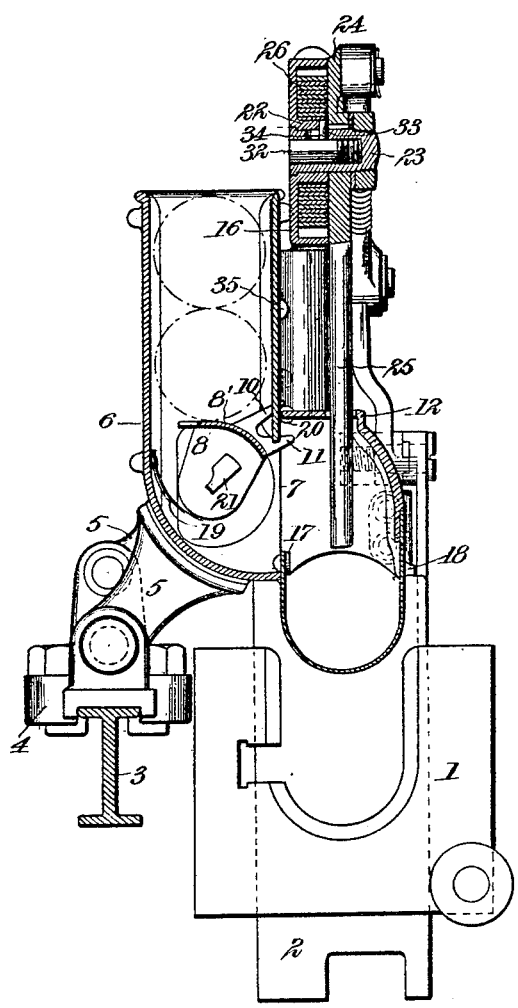
Figure 3:
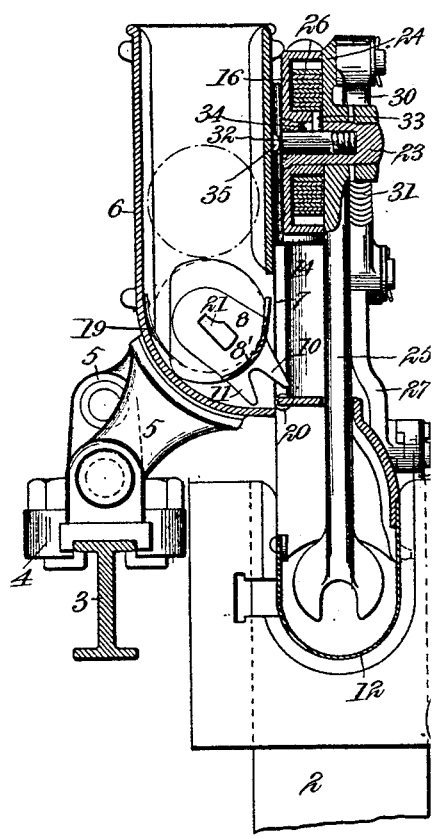

With the above objects in view, the invention consists in the novel features of construction hereinafter fully described, particularly pointed out in the claims, and clearly illustrated by the accompanying drawings, in which, Figure 1 is a side elevation of our improved automatic gun, the parts being shown in their normal positions; Fig. 2, a vertical, transverse section of Fig. 1; Fig. 3, a similar view, the parts being shown in loading position, the rammer having operated to position the cartridge in the chamber of the gun; Fig. 4, details of the supporting-frame for the rammer and the spring-casing; Fig. 5, a front elevation, and vertical, transverse section of the hopper and cartridge-feeding member; Fig. 6, similar views of the loading or cartridge-delivery member; Fig. 7, a view of the feeding-member removed from the hopper; Fig. 8, a detail view showing the yielding connection between the two members of the two-part actuating lever for the rammer; Fig. 9, a side elevation of a modified construction of automatic gun; Fig. 10, an end elevation of the same; Fig. 11, a side elevation partly in section of another mo form of our improved automatic gun Fig. 12, an end elevation of the same.

Referring now more particularly t drawings, 1 indicates a recoiling gun "Hotchkiss" type having a drop-blo and provided with the mechanism show described and claimed in Letters Pater 673,594, dated May 7th, 1901, for matically actuating the block to ope breech; ejecting the empty case; co the hammer, and energizing a sprii moving the block to close the breech, said block has been released by the ins of a fresh cartridge.

Attached to the shoulder-arm 3 mount, by suitable clamps 4, are br 5, supporting a hopper 6, the front which is disposed above and in line w: inner wall of the opening formed in the wall of the gun-breech, cutting the l the gun, to receive the cartridge, so th hopper does not project over the bore gun. The front wall of said hopper is i near its lower end with an egress ope through which the loaded rounds are the delivery-member, and the botto: of the hopper is curved toward the edge of said egress-opening, as illustr Figs. 2, 3 and 5.

*Cartridge-feed and delivery mei* Mounted in the lower end of the hopp oscillating cartridge feeding member 8 form of a cradle extending longitudii the hopper and having a wall 8' for: the arc of a circle of which the pivot: of the cradle is the center. The swings on trunnions 9 extending ou1 from the end portions thereof and e suitable bearings formed in the end- the hopper. Said cradle is providi each end with two arms 10 and 11 pr through slots in the front wall of the to the exterior thereof in the path of ciprocating delivery-member 12, said and 11 being in vertical alignment. livery-member slides upon the front the hopper and is in the form of a c suitable size to fit into the breech-< into which it drops when deliverin tridge from the hopper to the gun. per portion of one of the walls of the < the inner wall, is removed to form
s opening for the cartridges from the he upper wall of the delivery-mem-
ie uprights 13 which slide in guides
d by the front-wall of the hopper,
ecting these uprights at their upper
ι cross-arm 15 having formed cen-
ereon, a circular spring-casing 16
ll be fully described in conection
rammer.
eration of the cartridge feeding and
ζ mechanism described, is as fol-
s shown in Fig. 2, in their normal po-
ιe delivery-member is elevated, being
at position by the block 2, said mem-
g in the cut-out portion at the upper
e block; the wall 8' of the feeding-
s supporting the rounds of ammuni-
e hopper, and beneath said member
ver portion of the hopper is a round
inition which has been separated
 main supply by the feeding-mem-
 manner presently to be described,
d being held in the hopper by the
g edge 17 of the delivery-member.
tends slightly above the bottom
 the egress-opening of the hopper
 delivery-member is in its raised po-
As soon as the gun is fired, it recoils
ly, the block sliding upon a plate or
ormed upon the delivery-member
learly in Fig. 6), said lug forming a
surface. Upon counter-recoil, the
wered by the mechanism described
rated in said patent before referred
 the delivery-member is held from
d movement by a projection 18¹ on
rd end which rests on the gun body
coil of the gun and also until the
 nearly completed its counter-recoil.
 begins to fall as soon as the gun be-
unter-recoil and is in its downward
osition before the gun reaches bat-
le the sliding delivery-member does
v the block until the gun has practi-
pleted its counter-recoil, the pro-
3¹ being of such length as to permit
on of the delivery-member at this
 that ample time is allowed for the
se to leave the gun. As soon as the
 member has moved downwardly a
 distance to bring its projecting edge
 the wall of the egress opening of the
he round in the lower portion of the
rops into the delivery-member, this
t of the round being facilitated by a
 secured to the rear wall of the hop-
 the interior thereof. Said spring is
 several thin plates secured together
ipper ends and is very flexible and
 The round is thus carried down-
y the delivery-member into the bore
n in position to be rammed by the
presently to be described. During
its downward movement, a bead or projection 20 carried by the upper portion of the delivery-member has engaged the arms 11 of the cradle and swung the latter on its pivots, removing the wall 8' thereof from beneath the supply of ammunition and preventing the lowermost round from passing through the egress opening of the hopper. When the block returns to its closed position, the delivery-member is lifted to its normal position, and during its upward movement, arms 10 are engaged by the bead 20 and the cradle swung on its pivots to its normal position, the wall 8' thereof traveling around the lowermost cartridge and cutting the same out from the remaining rounds. It will thus be seen that the wall 8' of the cradle swings or oscillates about the lowermost cartridge of the main supply. The projectile end of the round being heavier than the cartridge-case, has a tendency to drop more quickly, and to prevent this, the cradle is provided at that end with a lug 21 which catches the pointed end of the projectile and serves to retard the movement of the same at that end.

*Rammer and mechanism for actuating the same.*—The spring-casing 16 is formed with a hollow boss or bearing 22 to receive a pivotal-bolt 23 by means of which the outer plate 24 of the casing is pivotally attached thereto. Formed as a part of this plate 24, is the rammer, which is in the form of an arm 25, extending centrally from the plate, downwardly into the delivery-member, through suitable slots in the upper wall thereof, the lower end of the arm being enlarged where it engages the cartridge. Positioned in said casing is a "clock-spring" 26, one end of which is attached to the casing and the outer end to the plate 24, and the tendency of the spring is to hold the rammer with its lower ramming-end forward in the delivery-member, as illustrated in Fig. 1. Pivoted to the exterior of the forward portion of the delivery-member, is a two-part actuating lever, the two parts 27 and 28 of which are connected so as to have a slight play, by the construction illustrated in Fig. 8, wherein it will be seen that the two parts are provided at their joint with interlocking projections 27' and 28', the spaces between the projections being greater in width than the width of the projection. A spring 29 serves to hold the projections of said members 27 and 28 in such relative position that there will be no play between the parts when the lower member of the lever is swung rearwardly upon the pivot thereof to retract the rammer. The construction, however, affords a slight play when the lever is swung in a reverse direction, and this is provided for the purpose of preventing damage to said lever, should the block not have moved downwardly a sufficient distance to clear the same, on the return to battery of the gun, as will be fully understood when the operation of the rammer is more fully explained.

The rammer is eccentrically connected with the upper member 27 of the actuating lever by a yielding or flexible link 30, one end of said link being pivotally attached to said member and the other end thereof being pivotally connected with the plate 24. This link is formed of two parts each threaded into one end of a closely coiled spring 31, which spring is of greater strength than the spring 26. This elastic connection is for the purpose of permitting the link to yield should the action of the mechanism be impeded in any way.

The operation of the rammer and rammer mechanism is as follows:—The normal position of the lower member of the actuating lever is in the opening in the upper wall of the gun-breech just in front of the block, the lever in the present instance lying in the recess formed in the side of the block. As the gun recoils, this lever is swung on its pivot, and through the medium of the connecting link 30, the rammer-arm 25 is swung rearwardly to a position just outside of the rear end of the delivery-member. For locking the rammer-arm 25 in this rearward position until the round of ammunition is in proper position, a spring-pressed plunger 32 is provided, which plunger is positioned in the pivotal-bolt 23 and moves therewith as the plate 24 is actuated by the actuating lever and link. This plunger is provided with a stud or pin 33 which enters a slot 34 formed in the boss 22 of the spring-casing, illustrated in Figs. 2, 3 and 4, when the plunger has been moved far enough to bring the stud in position to so act. With the stud in this position, the rammer-arm is held retracted with the spring 26 under tension. When the delivery-member has about reached its lowermost position in the bore of the gun, the stud carried by the plunger is withdrawn from the slot of the spring-casing, by the contact of the plunger, which, when the stud is in said slot, projects from the rear face of the casing, with a tripping-projection 35 carried by the front wall of the hopper, it being understood that the rammer and its actuating mechanism drop with the delivery-member, being carried thereby. As soon as the rammer-arm is released, the spring 26 swings it forward to its normal position, pushing the round of ammunition which was carried downward by the delivery-member, into the chamber of the gun, the delivery-casing being open at the lower portion of its forward end to permit the passage therefrom of the cartridge.

It will be noted that the rammer above described follows the cartridge entirely to its firing position, which is a decided advantage over those constructions wherein the rammer throws or flips the rounds into the chamber of the gun, as in the latter constructions, very often the cartridge is not moved entirely into the chamber and the operation of the gun is stopped, jamming and breaking the mechanism. It will also be seen that in the present invention, the hopper is fixed which is an advantage over constructions wherein the entire hopper reciprocates in delivering the rounds to the gun, for the reason that where the hopper itself reciprocates the movement thereof is so rapid as to jolt the rounds therefrom, and also there is liability of the rounds being accidentally exploded by this violent jolting.

*Modified construction, Figs. 9 and 10.*—In this construction the feeding and delivery members are constructed as hereinbefore set forth, the rammer and its locking mechanism, however being differently arranged. The delivery-member is provided with two longitudinally-extending, parallel, spring-casing 36, in which coiled springs 37 are arranged. Pistons or stems 38 are adapted to slide in these casings, and connecting the same intermediately of their ends is a cross-piece 3 having a centrally-disposed ramming-toe 4 which moves in the delivery-member, longitudinally thereof. The forward ends of the pistons or stems 38 normally abut against the rear end of the gun-breech so that upon recoil of the gun, they are forced rearwardly against the tension of spring 37. To hold the rammer in its retracted position against the tension of said springs, a spring-pressed locking bolt 41 is provided, said bolt being mounted upon the end wall of the delivery member and having its lower end formed to engage in a notch in one of the stems or pistons 38 when the latter has been moved rearwardly by the gun. The upper end of the bolt 41 is formed with a head 42 to contact with a tripping projection 43 carried by the end wall of the hopper, when the delivery member has been moved downwardly a sufficient distance.

*Modified construction, Figs. 11 and 12.*—In this construction a sliding hopper 44 provided, which reciprocates with the block it sliding on guides 45 attached by suitable clamps 46 to the shoulder arm of the gun. This hopper has a rammer somewhat similar to that described in relation to Figs. 9 and 10, the stem thereof being U-shaped, the legs 47 of which reciprocates through casings against the tension of springs 49 in a rearward direction, and carry a ramming-toe.

The feeding-mechanism consists of two intermediately-pivoted members 51 mounted upon the exterior of the respective end walls of the hopper, the pivotal point of one being slightly above the pivotal point of the other, as illustrated. A link 52 pivotally connects the upper portion of one of these members with the lower portion of the other, and said members are each provided on the respective sides of the pivot thereof with a toe 53, portion of one of the members is
and bifurcated to straddle the rear
the U-shaped rammer. When the
s moved rear-wardly by the recoil-
t of the gun, the member 51 having
ive connection therewith is swung
rot to bring its lower toe 53 from
he lowermost round in the hopper,
ipper toe 53 is moved between said
l the main supply, and through the
if the link 52, a corresponding move-
mparted to the other member 51.
everse movement of the rammer,
bers 51 are actuated to withdraw
: toes from beneath the supply of
on, and swing the lower toes be-
e same, permitting the supply to
tly. The rammer in this construc-
d retracted by a spring-pressed bolt
d by contact with a stud 55 carried
pper-support.
be understood that mechanism will
led for automatically releasing the
to fire the gun, such a means being
d and described in an application
led by Charles W. Bartholmes, on
day of November, 1902, bearing
131,194.
thus fully described our invention,
laim as new and desire to secure by
atent of the United States, is:—
n automatic gun, a hopper for the
ounds having an egress opening, a
ember in said hopper adapted when
i one direction to swing from be-
lowermost round and into position
id egress opening and when moved
rse direction to pass between the
t round and the supply and separate
rmost round therefrom, a deliver,-
adapted to reciprocate on said hop-
elivering the rounds to the gun and
with an ingress-opening adapted
ight into coincidence with the egress
of the hopper to receive the round
i, and means for effecting the move-
he feeding and delivering members.
in automatic gun, a hopper for the
unds, a delivery member adapted to
te on said hopper for delivering the
o the gun, and a feeding-member
when acutated to separate a round
main supply and provided with
projecting in the path of the deliv-
ber, whereby the movement of the
ects the movement of said feeding in automatic gun, a hopper for the
ounds, a feeding member adapted
uated to separate a round from the
ply, a delivery-member mounted in
itly of the feeding-member and
to receive the round and convey the
the gun, and means for retaining the
the hopper until the delivery-mem-
ber has begun its travel to the gun, said feeding and delivery-members being constructed and arranged to movably engage each other, whereby the movement of one effects the movement of the other.

4. In an automatic gun, a rammer for moving the loaded round into firing position, an actuating lever for said rammer actuated by the movement of the gun after firing for moving the rammer to operative position, and means energized by the movement of said rammer to operative position for actuating the rammer to move the round into firing position.

5. In an automatic gun, a hopper for the loaded rounds having an egress-opening, a delivery-member adapted to reciprocate on said hopper for delivering the rounds from the hopper to the gun and provided with an ingress-opening adapted to be brought into co-incidence with the egress-opening of the hopper to receive the rounds therefrom, a feeding-member for feeding the rounds to the delivery-member, and means for actuating the feeding and delivery members.

6. In an automatic gun, a swinging rammer for moving the loaded round into firing position, an intermediately pivoted lever actuated by the movement of the gun on recoil, an operative connection between said lever and rammer, and actuating means energized by the movement of the rammer to operative position adapted to actuate said rammer to move the round to firing position.

7. In an automatic gun, a rammer pivotally mounted for moving the loaded round to firing position, an intermediately pivoted lever actuated by the movement of the gun on recoil for moving said rammer to operative position, a link pivotally connected to said lever and having a pivotal connection with the rammer eccentrically of the pivotal point thereof, and means energized by the movement of the rammer to operative position for moving said rammer in a reverse direction.

8. In an automatic gun, a rammer pivotally mounted for moving the loaded round to firing position, an intermediately-pivoted lever actuated by the movement of the gun on recoil for moving said rammer to operative position, a flexible link pivotally connected to said lever and having a pivotal connection with the rammer eccentrically of the pivotal point thereof, and means energized by the movement of the rammer to operative position for moving said rammer in a reverse direction.

9. In an automatic gun, a pivotally mounted rammer for moving the loaded round to firing position, an intermediately pivoted lever actuated by the movement of the gun on recoil for moving the rammer to operative position and constructed to have a slight play in a direction reverse to that of the movement of the gun on recoil an operative connection between the lever and the rammer, and means energized by the movement of the rammer to operative position for moving said rammer in a reverse direction.

10. In an automatic gun, a hopper for the loaded rounds, a delivery-member for delivering the rounds from the hopper to the breech of the gun, a rammer pivotally mounted on the delivery-member, an actuating lever mounted on the delivery-member and adapted to be actuated by the movement of the gun for moving the rammer to operative position, an operative connection between the lever and the rammer, a spring energized by the movement of the rammer to operative position adapted to actuate said rammer in a reverse direction, locking means for holding said spring under tension, a tripping member independent of the delivery-member adapted to release said spring when the delivery-member has moved a sufficient distance to bring said locking means into contact therewith, and means for actuating said delivery-member.

11. In an automatic gun, a hopper for the loaded rounds, a delivery-member for delivering the rounds from the hopper to the breech of the gun, a rammer carried by the delivery-member and constructed and arranged to be moved to operative position by the recoil-movement of the gun, a spring energized by the movement of the rammer to operative position adapted to actuate said rammer in a reverse direction, locking means for holding said spring under tension, tripping means independent of the delivery-member for releasing said spring when the delivery-member has moved a sufficient distance to bring said locking-means into contact with the tripping-means and means for actuating the delivery-member.

In testimony whereof we have hereunto affixed our signatures in the presence of two witnesses:—

WILLIAM H. BEVANS.
CHARLES W. BARTHOLMES.

Witnesses as to Bevans:
  CHAS. L. GULICK,
  L. E. BRADSTREET.

Witnesses as to Bartholmes:
  G. V. HUMPHREYS,
  EDWARD BEACH.